United States Patent [19]

Barley

[11] Patent Number: 4,496,190
[45] Date of Patent: Jan. 29, 1985

[54] PARALLEL FOLDING ARMREST

[75] Inventor: Geoffrey W. Barley, Brookfield, Wis.

[73] Assignee: UOP Inc., Des Plaines, Ill.

[21] Appl. No.: 465,238

[22] Filed: Feb. 10, 1983

[51] Int. Cl.³ .............................................. A47C 7/54
[52] U.S. Cl. .................................... 297/411; 297/417
[58] Field of Search ....................... 297/411, 417, 359

[56] References Cited

U.S. PATENT DOCUMENTS

| | | | |
|---|---|---|---|
| 3,489,458 | 1/1970 | Karlsen | 297/417 |
| 4,165,901 | 8/1979 | Swenson et al. | 297/417 |
| 4,244,623 | 1/1981 | Hall et al. | 297/417 |
| 4,307,913 | 12/1981 | Spiegelhoff | 297/417 |
| 4,311,338 | 1/1982 | Moorhouse | 297/411 |

FOREIGN PATENT DOCUMENTS 746313 3/1954 United Kingdom .

*Primary Examiner*—Francis K. Zugel
*Attorney, Agent, or Firm*—James R. Hoatson, Jr.; Barry L. Clark; William H. Page, II

[57] ABSTRACT

Parallel folding armrest assembly for use on a vehicle seat has a rear hollow housing portion with a forward armrest portion pivotally mounted at its forward end for movement between several parallel positions including a low position which can form a seat cushion extension. The housing portion comprises one elongated element of a four-link parallelogram linkage and has a curved upper forward end surface which conceals the linkage and prevents any possibility of finger pinching during adjustment. An actuating lever positioned in the armrest can be manually lifted about a pivot pin to release a locking pawl slidably carried on one of the parallelogram links from engagement with a selected tooth of a curved rack attached interiorly of the aforementioned curved end surface. A single round bar pivotally supports the housing and is adapted to be demountably fixed to the rear short parallelogram link. The single bar facilitates mounting of the assembly to either side of a seat and to a variety of seat configurations. A modified construction includes a spring biased locking link which is released by forward sliding movement of the actuating lever to permit tipping up of the armrest to facilitate access to the seat.

11 Claims, 9 Drawing Figures

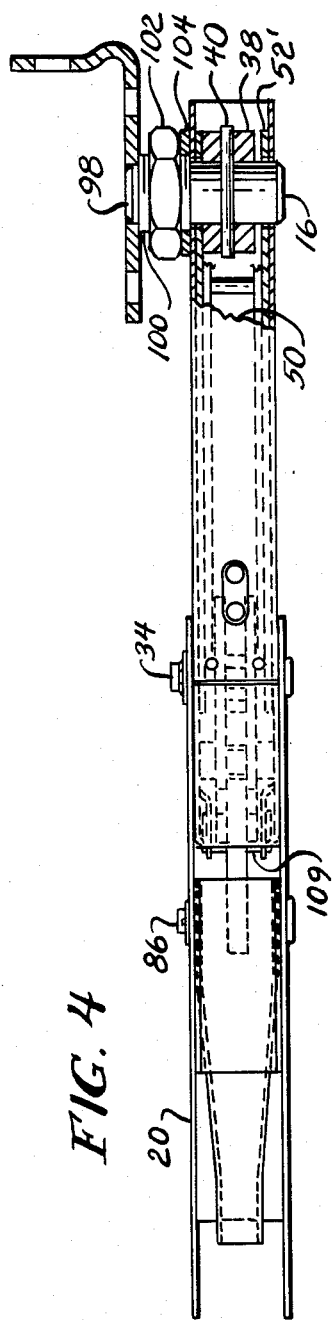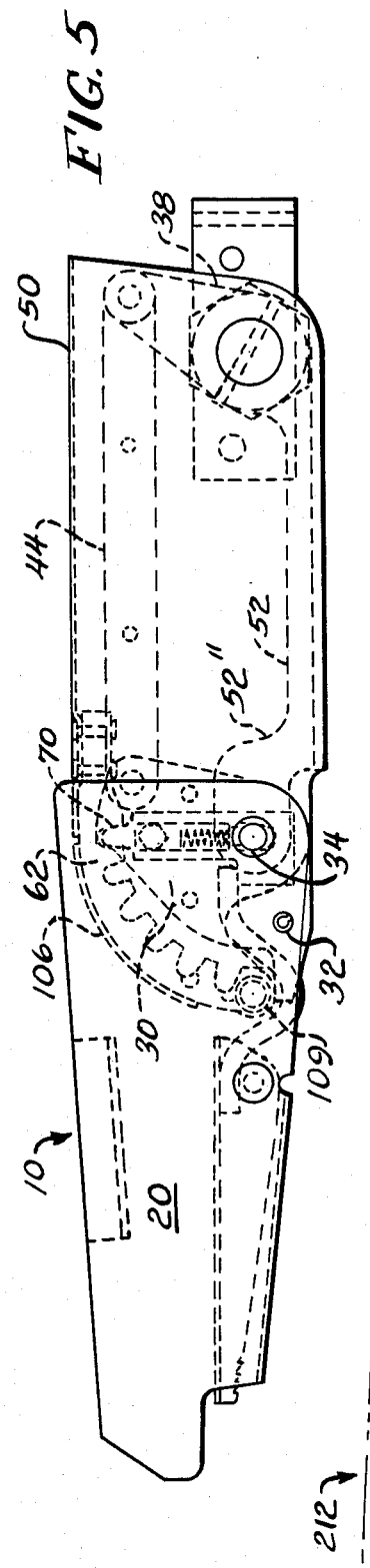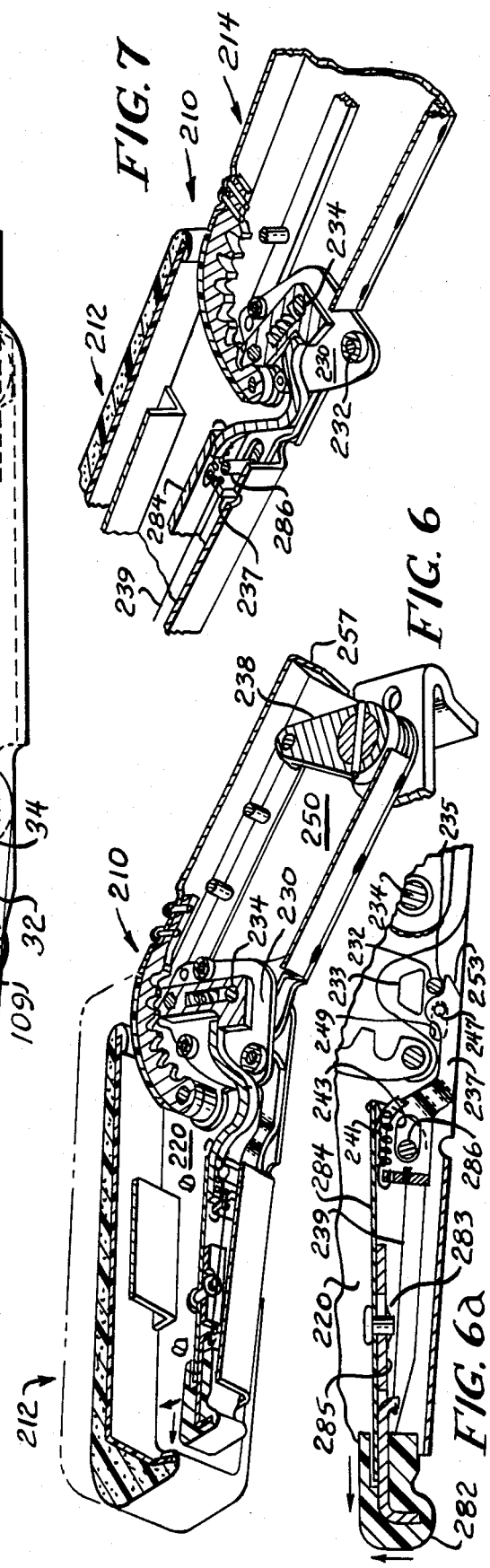

PARALLEL FOLDING ARMREST

BACKGROUND OF THE INVENTION

The invention relates to seating and particularly to armrests for vehicle seats which can be adjusted to a plurality of selected parallel positions to maximize the comfort of the occupant. Examples of such armrests can be found in Hall et al U.S. Pat. No. 4,244,623, Swenson et al U.S. Pat. No. 4,165,901 and Moorhouse U.S. Pat. No. 4,311,338. Each of the aforementioned patents utilizes a 4-bar parallelogram linkage. Karlsen U.S. Pat. No. 3,489,458 and British Pat. No. 746,313 also show parallelogram linkages but offer only a single use position. Most parallelogram linkages present some possibility of finger pinching as the linkage elements are pivoted. Although the problem is minimized in covered armrests such as shown by Karlsen and Moorhouse, it is not entirely eliminated since the rear vertical clearance space between the armrest and support housing varies as the armrest is lowered.

Another disadvantage of most prior art parallel folding armrests is that they require special mountings to accommodate them to the seat frame and thus they cannot be readily adapted for use with a variety of seats which might be in a given manufacturer's line. The mounting problem can be significant since a seat frame is often quite compact while a substantial distance is usually required between the two elongated links of an armrest assembly in order to provide sufficient rigidity and strength and to accommodate the desired movement. Loading of such assemblies can be very large since the seat occupant often grabs the armrest to pull himself up from the ground and into the seat of a truck or tractor.

SUMMARY OF THE INVENTION

It is among the objects of the present invention to provide a parallel folding armrest assembly which is compact, lightweight, strong and capable of being mounted to a wide variety of seat frames. It is another object to provide such an assembly which is constructed so as to substantially eliminate any possibility that a user's fingers could be pinched by either the linkage mechanism or by a change in the clearance space between the armrest and the linkage housing as the armrest is raised or lowered.

The foregoing and other objects are achieved by the armrest assembly of the present invention in which the parallelogram linkage is mounted within a hollow sheet metal housing having a generally rectangular cross-section. The housing performs double duty as the lower elongated element of the parallelogram linkage and thus reduces the weight and number of parts of the assembly while maximizing its compactness for a given degree of stiffness as determined by the length of the relatively short end links. The short rear end link contains a relatively large diameter transverse aperture which is adapted to receive a complementary round mounting pin supported by the seat frame. The pin can project from either side of the assembly and thus permits the assembly to be used as either a left or right side armrest. A keying means, such as a transverse roll-pin, prevents relative rotation between the short end link and the mounting pin and thus causes the short link to become an extension of the seat frame. The mounting pin is also the element by which the hollow housing member is pivoted to either side of the seat frame. The mounting pin could be welded directly to a seat frame or could be welded, for example, to a simple mounting bracket which could be screwed to a seat frame. Such mountings are far simpler than providing separate mountings between widely spaced parallel links and a seat frame. The simplified mounting arrangement also provides ample clearance for the mounting of seat belts while the narrow side profile of the assembly makes it possible to provide armrests in certain cab configurations where the space is too limited for most armrests.

The weight and compactness of the assembly is optimized by utilizing the hollow sheet metal housing for the parallelogram linkage as one of the elongated links. The possibility of one pinching one's fingers between the rear end of the armrest and the elongated support housing during movement of the assembly is substantially eliminated by curving the upper forward outer surface of the support housing in a plane about the armrest pivot connection to the housing. Thus, in all possible positions of the armrest relative to the housing, the clearance distance between them is maintained constant. Compactness of the assembly is further enhanced by forming the upper and forward parallelogram link means as pairs of spaced elements which straddle the rack and pawl mechanism which locks the linkage in various selected positions. The rack element is curved and has a series of inwardly facing teeth which are selectively engaged by a sliding spring biased pawl or tooth which is moved to its disengaged position by depressing the outer end of a pivotally mounted actuating lever.

In one embodiment, the pair of spaced side plates which straddle the rack and the locking mechanism are pinned to the armrest element at both its pivot point to the support housing and at a second point spaced from said pivot point. In this embodiment, the armrest can move only through a range of parallel positions. Ordinarily, the lowest possible position is one which is flush with the seat bottom cushion so that the armrest will form a short extension of the seat. Such an extension could be useful to provide support for a second occupant for a short distance of travel. Where the cab configuration is too cramped to allow the armrest to move to this lowest position, a pin can be placed through the sides of the armrest frame to abut the forward end of the rack, thus forming a different down-stop.

In a second disclosed embodiment, the actuating lever is modified so that it can be pulled forward against a spring to release the armrest from restraining engagement with the aforementioned second pin. Once released, the armrest can be freely pivoted about its pivot attachment point to the housing. This permits the armrest to be lifted to a generally vertical storage position when the housing is in its generally vertical position. In such position, neither the armrest or its housing will interfere with ingress or egress to or from the seat. In the vertical storage position, the armrest will be maintained upright by its weight and its off-center pivot. Thus, it can be easily moved to its horizontal position without actuating the actuating lever. This feature is useful since an occupant might wish to raise the armrest to make it easier to leave the vehicle but might want to have it horizontal so it could be more easily grabbed to facilitate climbing back up into the vehicle.

BRIEF DESCRIPTION OF THE DRAWINGS

FIG. 4 is a top view showing the internal metallic structure of the armrest of FIG. 1-3 in its horizontal FIG. 5 position;

FIG. 5 is a side view of the structure of FIG. 4;

FIG. 6 is a perspective sectional view similar to FIG. 1 but showing a modification in which the armrest can be pivoted relative to the housing to a vertical storage position when the housing is in a generally vertical position;

FIG. 6A is an enlarged side sectional view of the FIG. 6 modification taken in the same plane as FIG. 6 but with certain elements removed for clarity; and FIG. 7 is a partially broken away side sectional view of the FIG. 6 modification but showing the armrest and housing in their aligned vertical storage position.

DETAILED DESCRIPTION OF THE DRAWINGS

Figure 1:
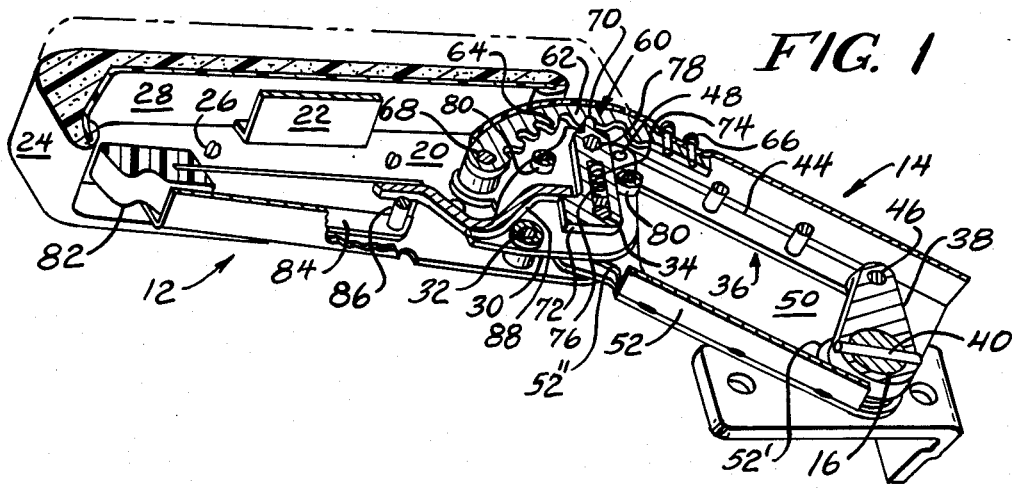
FIG. 1 is a perspective view of the armrest assembly taken on a vertical cross-section through its center, showing one of its lower positions of adjustment.

In FIG. 1, the parallel folding armrest assembly is indicated generally at 10 and includes a forward armrest portion indicated generally at 12 which is carried by a rearward generally hollow support housing portion indicated generally at 14. The housing portion 14 is adapted to be mounted on either side of a vehicle seat by a single fixed mounting pin 16. The armrest portion 12 has a sheet metal frame comprising an upwardly open channel 20 which may be reinforced at its top by a transverse reinforcing bracket 22 which may be spot-welded to it. Although the armrest is shown as being covered by a relatively narrow upholstered cap portion 24 held to the channel 20 by fasteners 26 which pass through its plastic frame 28, the cap could be made much wider, if desired. Such a wide cap would be useful as a seat extension when lowered to a position flush with the seat cushion and could provide some measure of support for a second seat occupant for a short trip. For example, a second person might be needed to operate auxiliary equipment out in a field. When such a wide cap portion is required, it is preferable to provide a box-like frame extension for it on one side of the channel frame 20.

In the embodiment of FIGS. 1-5, a pair of transversely spaced side plates 30 are fixed to channel frame member 20 by a lower forward pin 32 and a lower rearward main pivot pin 34. The side plates 30 also comprise the forward short link element of a four-bar parallelogram linkage indicated generally at 36. The rear link 38 of the linkage 36 is adapted to be fixed relative to the mounting pin 16 and thereby to the frame of the seat (not shown) by a locking pin 40. The aperture in the rear link 38 which accepts the locking pin 40 is preferably located on an axis which is normal to the mid-line of the link so that the same assembly 10 can be fitted to either the left side or the right side of a seat. A pair of elongated upper links 44 straddle the fixed rear link 38 and have their rear ends mounted to it by a rear upper pivot pin 46. The forward ends of elongated links 44 are each pivoted to one of the spaced side plates 30 by flush mounted stub pivots 48. The lower element of the linkage 36 is formed by the rear housing 14 which preferably comprises a downwardly opening bent sheet metal channel 50 to which an abbreviated upwardly opening channel 52 is welded. The ends of the channel 52 are preferably somewhat enlarged in a vertical direction so as to provide, in combination with channel 50, a bearing surface of double metal thickness for the pivot pins 34, 16.

To permit the armrest 12 to move to different selected parallel positions within the range of the parallelogram linkage 36 to which it is attached, a locking means indicated generally at 60 is provided. The locking means 60 includes a curved rack member 62 which may be molded of powder metal and includes a plurality of teeth 64 corresponding to the desired movement range. The rack member 60 is fixed to the channel portion 50 of the support housing 14 by a pair of rivets 66 and by a transverse pin 68. The rack teeth 64 are adapted to be selectively engaged by a locking pawl or tooth 70 formed on a slidable element 72 which may also be molded of powder metal. When armrest movement is desired, a shoulder portion 72' on the element 72 is adapted to be engaged to move the element downwardly against the force of a biasing spring 74 located in a slot 76 in the element. The element 72 is guided for movement on the side plates 30 by hexagonal shaped projections 78 which slide in slots 79 in the side plates 30 and also by the cooperation between slot 76 and the pivot pin 34. A pair of spacers 80 keep the side plates 30 sufficiently spaced apart to prevent binding against the pawl element 72. When it is desired to lower the pawl 70 from locking engagement with the rack member 62, a handle element 82 is manually lifted. This movement pivots the channel shaped handle support lever 84 about its pivot connection 86 to the channel frame member 20 and forces the curved lever extension portion 88 welded to it to press down on the shoulder portion 72'. While the pawl is disengaged, the armrest 12 can be readily lifted to any desired vertical position and the handle 82 released to maintain the position.

Figure 2:
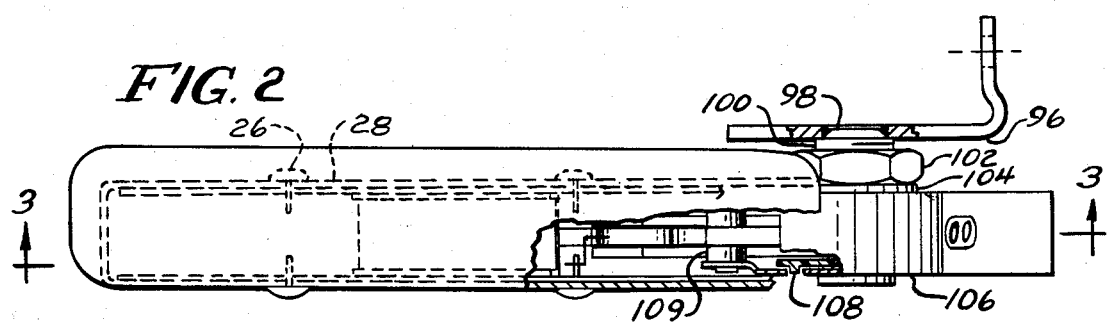
FIG. 2 is a top view of the armrest assembly of FIG. 1 in its FIG. 3 position of adjustment with portions broken away for clarity.
Figure 3:
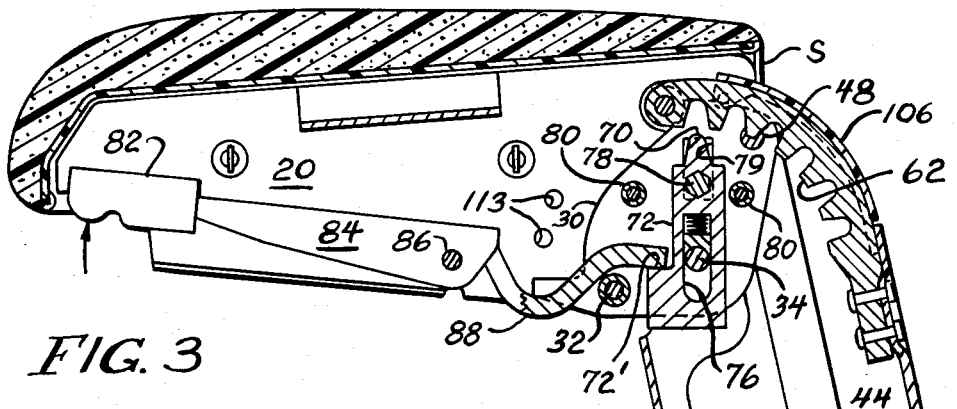
FIG. 3 is a side sectional view of the armrest assembly of FIG. 2 taken on line 3—3 of FIG. 2 and showing the locking pawl actuating lever in its actuated or unlocked position wherein the assembly can be freely moved throughout its range of adjustment.

FIGS. 2 and 4 illustrate the compact manner in which the assembly 10 may be mounted on either side of a seat frame. A simple support bracket 96 which could be used to mount the mounting pin 16 to either side of a seat frame has an aperture in which a reduced diameter end portion 98 of the pin 16 would be welded so that the pin is angularly oriented to position the locking pin 40 and rear link 38 as shown in FIG. 3. A short threaded portion 100 adjacent the pin end 98 permits a nut 102 to be lightly forced against the large fiber washer 104 to remove any looseness in the mounting. As can be seen in FIG. 4, the locking pin 40 cooperates with the nut 102 to close the gap between the link 38 and the channels 50, 52. To mount the armrest assembly to the right side of a seat, one would merely loosen the nut 102, remove the locking pin 40, reposition the pin 16 and bracket 96 on the other side of the housing 14, and then reinsert the pin 40 and tighten the nut 102.

A unique feature of the assembly 10 is its ability to eliminate finger pinching in the space "S" (FIG. 3) between the rear end of the forward armrest 12 and the upper surface of the rear support housing 14 as the armrest is raised or lowered. The dimension of the space "S" remains constant as the armrest is raised or lowered since the upper forward portion of housing 14 is covered by a curved plastic cap 106 which has a curvature on its outer surface which lies on a circle having the pivot pin 34 as its center. The rear end of cap 106 has a recessed portion which underlies the top wall of the channel 50 and the front end has side projection portions 108 which snap into small apertures in the channel 50, as can be seen in FIGS. 2 and 3. The inwardly facing tips of the rack teeth 64 also lie on a circle having pivot pin 34 as its center.

Figure 3A:
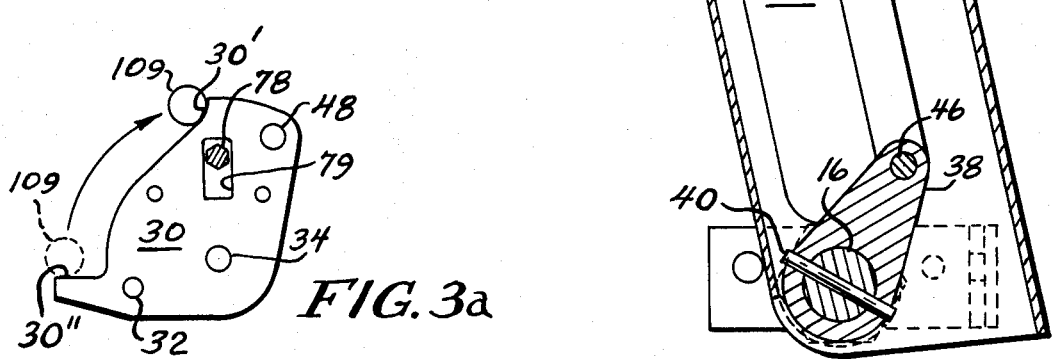
FIG. 3A is side view of the side plate which is partially hidden in FIG. 3, illustrating how it acts as an up-stop and a down-stop.

FIG. 3A more clearly illustrates one of the side plates 30 which are partially hidden in FIG. 3. Specifically, it illustrates the end projections 30', 30" which function as upper and lower rotation limit stops when engaged by the cylindrical spacer members 109 supported on pin 68 which mounts the curved rack member 62 to the channel member 50. Where vehicle interferences make it necessary to restrict the downward movement of the armrest, a cross-pin (not shown) could be placed through one of the pairs of apertures 113 (FIG. 3) which can be optionally located on opposite sides of the armrest frame channel 20. The cross-pin would intercept the forward end of the curved rack and prevent any possibility of pinching any of the occupant's fingers which are underneath the armrest as it is lowered. This feature is especially useful when the armrest is to be used with certain vehicles that have hand controls located to the sides of the seat.

Another advantageous feature of the aforementioned construction is its extreme compactness for the strength it provides. To provide strength and an extended movement range, it is desirable that the short links of a parallelogram not be too short. By using the housing 14 which encloses the linkage 36 as one of the links and by mounting the links 44 outboard of the rack teeth 64, the desired strength, movement range and compactness is achieved.

FIGS. 4 and 5 show the top and side of the armrest assembly 10 of FIGS. 1–3A with the upholstery removed so that just the basic metal portions of the frame and the plastic cap 106 are shown. The top of the channel 50 is broken away in FIG. 4 and the link 38 is sectioned to more clearly illustrate portions 98 and 100 of the pin 16 and the cooperation of washer 104, nut 102 and pin 40 in removing any looseness in the joint. The assembly is shown in its horizontal position wherein it would be flush with a seat cushion (not shown). In this position, the pawl 70 is in the last tooth on one end of the rack and the spacer 109 is in its lower stop position illustrated in dotted lines in FIG. 3A.

FIGS. 6, 6A and 7 illustrate a modified armrest assembly 210 which is substantially identical in all respects to the embodiment in FIGS. 1–5 except for additional elements and structural variations needed to permit the forward armrest portion 212 to be pivoted from a horizontal to a generally vertical alignment storage position so as to be in generally vertical alignment with the support housing 214 when the latter is in its most vertical position. For example, when assembly 10 is in its FIG. 5 position, the armrest channel frame 20 is rigidly fixed to side plates 30 by spaced apart pins 32 and 34. In the modification assembly 210, the pivot pin 234 is identical to pin 34 but pin 232 extends just short of contacting the channel frame 220 and thus, does not permanently lock the armrest channel frame 220 to the side plates 230.

However, when the manually actuated handle 282 is in its normal unactuated rearwardly biased position as shown in FIG. 6A, the pin 232 is captured between a boss 233 welded to the armrest frame channel 220 and the upper end edges 235 of a sliding "tilt-latch" actuator member 237. The actuator member 237 is released from contact with the pin 232 by a forward movement of the handle 282. The handle 282 has a pin and slot lost motion sliding connection 283 to the channel-shaped lever element 284 so the handle and its insert support plate 285 will move together vertically to actuate the pawl. However, element 285 can slide on element 284. The element 285 is attached to the actuator member 237 by a wire 239 which can pull the actuator member to the left in FIG. 6A against the bias of tension spring 241. This action permits actuator 237 to move so that the right side of its slot 243 engages pivot pin 286 and so that a pin 247 near its end slides to the left of a slot 249 formed in the frame channel 220. As long as the pin 232 is captured by actuator member 237, the armrest portion 212 will move in a parallel fashion when the handle 282 is simply raised. However, when the handle 282 is pulled forward, the pin 232 will be disengaged and the armrest portion 212 can be manually pivoted about pivot pin 234 to a generally vertical storage position where it will remain without locking since its weight will be overcenter of the pivot pin 234. If the armrest is in its low FIG. 5 position, the rear housing will be lifted simultaneously. In this vertical position, the armrest permits easy egress from the seat but yet can be easily lowered to the FIG. 3 horizontal position without actuating any controls if the occupant desires to pull on it to provide an assist in climbing back up into the vehicle cab. An angled cam portion 253 on the underside of the actuator member 237 permits the member to automatically snap over and into locking engagement with the pin 232 as the armrest is lowered to its horizontal use position.

Preferably, the projections 30" on the side plates 30 that act as lower stops for the spacers 109 in FIG. 3A are omitted in the embodiment of FIGS. 6 and 7 since they would constitute an obstruction. An alternative stop is provided by welding a transverse metal strap 257 across the back of channel 250 as shown in FIG. 6. The strap 257 will engage the fixed link 238 when the assembly 210 is fully lowered.

I claim as my invention:

1. A height-adjustable parallel folding armrest assembly for a seat comprising an elongated hollow support housing structure having a transverse bearing opening at its rearward end for receiving one end of a round support bar, the other end of the support bar being adapted to be non-rotatably mounted to the frame of a seat with which the assembly is to be used; an armrest member pivotally mounted adjacent its lower rear corner to an armrest pivot pin transversely mounted at a lower, generally forward, portion of said elongated housing structure which is longitudinally spaced from said bearing opening which receives said support bar; a curved rack member fixedly mounted internally of the forward portion of said elongated housing structure, tips of the internally positioned toothed surface of said rack member and the external surface of said housing structure which is behind said rack member lying in curved planes which have their centers coincident with said armrest pivot pin; a parallelogram linkage mounted interiorly of said hollow housing structure, said housing structure solely comprising one of the longer links of said linkage and said round support bar and said armrest pivot pin, respectively, comprising the pivot joints between said housing and the rearward and forward shorter links of said linkage, the rearward shorter link of said linkage being non-rotatably affixed to said support bar at one of its ends and to an elongated link means at its other end, the forward shorter link of said linkage comprising at least one plate-like member on which a locking pawl is mounted for selective movement into spring biased locking engagement with one of the teeth of said rack member, said locking pawl being movable by a manually actuated lever out of engagement with said rack member when it is desired to adjust the position of said housing structure and the height of said armrest.

2. The armrest assembly of claim 1 wherein means are provided for fixing said armrest member to said at least one plate-like member at at least two spaced locations, one of which is said armrest pivot pin.

3. The armrest assembly of claim 2 wherein said means for fixing comprises a selectively releasable latch at the other of said at least two spaced locations to permit relative rotation between said armrest member and said at least one plate-like member when it is desired to move said armrest member to a generally vertical storage position.

4. The armrest assembly of claim 2 wherein the other of said at least two locations comprises a pin which extends perpendicular to and through said at least one plate-like member.

5. The armrest assembly of claim 3 wherein said selectively releasable latch comprises a sliding plate member mounted on said armrest member, said sliding plate member being normally spring-biased into a position where it captures a pin mounted transversely of said at least one plate-like member at the other of said two spaced locations between a portion of said sliding plate member and a boss extending from said armrest member.

6. The armrest assembly of claim 5 wherein said sliding plate member has a cam surface on a side edge portion thereof opposite the portion which captures said pin, said cam surface being adapted to snap over said pin when said armrest member is moved from a vertical storage position to a horizontal use position.

7. The armrest assembly of claim 5 wherein said manually actuated lever is pivoted at its rearward end to said armrest member and is mounted with a lost motion sliding connection to an actuating handle at its forward end, said handle being slidably movable relative to said lever in a direction longitudinally of the armrest member to actuate said selectively releasable latch and being further movable in a rotational direction about the pivot axis of said manually actuated lever to actuate said lever so as to disengage said pawl from said rack member.

8. The armrest assembly of claim 1 wherein said parallelogram linkage includes a pair of elongated link means and a pair of plate-like forward shorter links which straddle side portions of said curved rack member as said armrest member is moved to various horizontal positions when said locking pawl is actuated.

9. The armrest assembly of claim 1 wherein said armrest member has a hollow channel-shaped frame with spaced apart vertical sides, each of said sides having at least one aperture therein in aligned relationship with an aperture in the other of said sides and located so that when a pin is placed between said apertures it will lie in the path of movement of the forward end of said curved rack member and limit the movement of said armrest relative to said support housing.

10. The armrest assembly of claim 1 wherein the forward shorter link of said linkage comprises a pair of spaced parallel plate members which straddle at least portions of the sides of said curved rack member, at least one of said plate members having a projecting portion at at least one peripheral portion thereof which is positioned to be engaged by a stop element mounted on the forward end of said rack member and extending in a direction perpendicular to the plane of said rack member.

11. The armrest assembly of claim 10 wherein said at least one plate member has projecting portions at spaced portions thereof which are positioned so as to be engaged by opposed sides of said stop element, thereby determining the upper and lower limits of the movement range of said rack element, said stop element being mounted on a pin which affixes the forward end of said rack member to said elongated housing structure.

* * * * *